US006378693B1

United States Patent
Ballestrazzi et al.

(10) Patent No.: US 6,378,693 B1
(45) Date of Patent: Apr. 30, 2002

(54) CONVEYOR WITH AUTOMATIC-REPOSITIONING TRIPPABLE PUSHERS

(75) Inventors: Aris Ballestrazzi; Lamberto Tassi, both of Savignano Sul Panaro (IT)

(73) Assignee: Sitma S.p.A., Spilamberto (IT)

( * ) Notice: Subject to any disclaimer, the term of this patent is extended or adjusted under 35 U.S.C. 154(b) by 30 days.

(21) Appl. No.: 09/663,200

(22) Filed: Sep. 18, 2000

(30) Foreign Application Priority Data

Sep. 22, 1999 (IT) .......................... MI99A1961

(51) Int. Cl.[7] .......................... B65G 19/00; B65G 19/26
(52) U.S. Cl. ........................ 198/732; 198/728
(58) Field of Search ............... 198/728, 729, 198/730, 731, 732

(56) References Cited

U.S. PATENT DOCUMENTS

| | | | | |
|---|---|---|---|---|
| 3,232,414 A | * | 2/1966 | Brigham et al. | 198/732 X |
| 3,876,062 A | * | 4/1975 | Honda | 198/732 X |
| 4,004,680 A | * | 1/1977 | Warmann | 198/732 X |
| 4,044,686 A | * | 8/1977 | Van Brakel | 198/732 X |
| 4,505,093 A | * | 3/1985 | Johnson | 198/732 X |
| 4,776,448 A | * | 10/1988 | Kulig | 198/477.1 X |
| 5,501,318 A | * | 3/1996 | Disrud | 198/732 X |
| 5,738,204 A | * | 4/1998 | Baumgartner | 198/732 |
| 5,937,999 A | * | 8/1999 | Spatafora | 198/728 X |
| 6,161,483 A | * | 12/2000 | Lipari et al. | 104/172.3 |

FOREIGN PATENT DOCUMENTS

| | | |
|---|---|---|
| FR | 2 408 996 | 6/1979 |
| FR | 2 448 849 | 9/1980 |

* cited by examiner

Primary Examiner—Christopher P. Ellis
Assistant Examiner—Gene O. Crawford
(74) Attorney, Agent, or Firm—Oblon, Spivak, McClelland, Maier & Neustadt, P.C.

(57) ABSTRACT

A conveyor with automatic-repositioning trippable pushers which is set along a sliding surface (12) for products (13) that are to be moved onwards comprises a continuous-drive element wound in a flattened loop (14) to which there may be constrained, at pre-chosen intervals, pusher assemblies (15), wherein each pusher assembly (15) consists of a carrying element (16) constrained to the continuous-drive element (14) by means of a pin (17) and of a pusher element proper (25, 125) that is trippable and comprises a base (26) and a shaped lever (27) that can oscillate (in 28) with respect to the base (26), there being provided elements of elastic engagement (34, 37, 38) between the carrying element (16) and the shaped lever (27) which keep the lever (27) in a position of thrust against a pre-determined force, yielding when a greater opposing force is exceeded, there further being provided, on the lever (27), elements of engagement (31) with the drive element (14) at points corresponding to end pulleys (23) which bring the shaped lever (27) that is oscillated and sent down back into an operating position, inserting again the elastic-engagement elements (34, 37, 38).

12 Claims, 6 Drawing Sheets

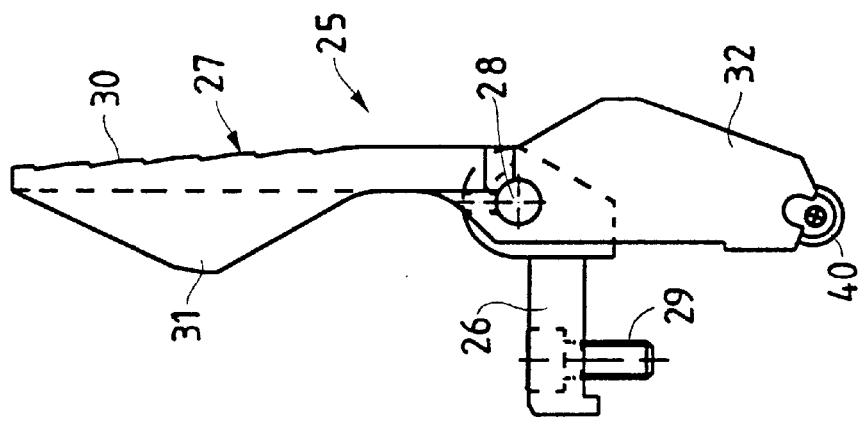
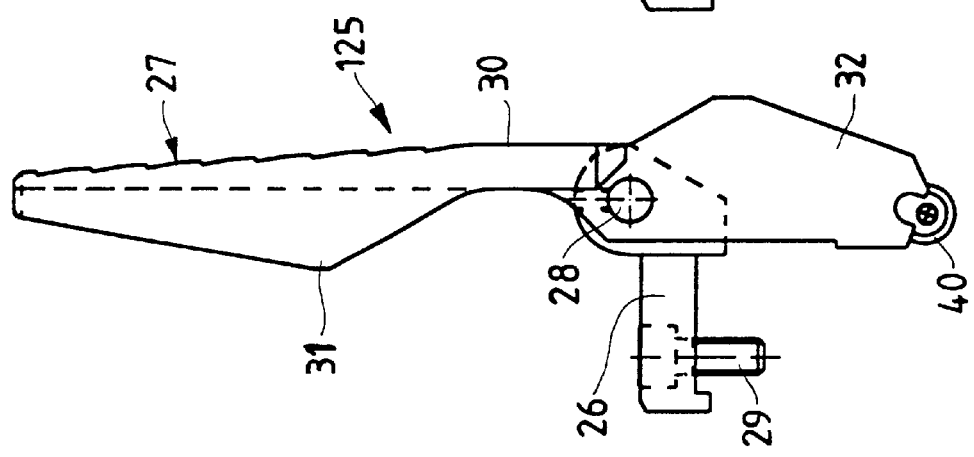
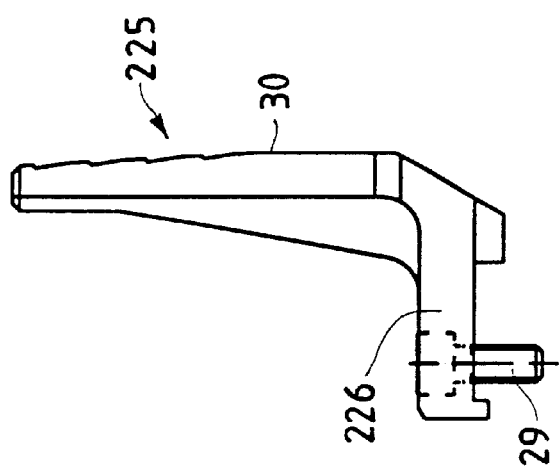

CONVEYOR WITH AUTOMATIC-REPOSITIONING TRIPPABLE PUSHERS

The present invention refers to a conveyor with automatic-repositioning trippable pushers.

At present, innumerable types of pusher conveyors are used for displacing products along paths of machines or into subsequent treatment stations.

Precisely on account of their nature, these conveyors present pushers arranged along their extension, which engage with the product or products to be displaced and displace them into the subsequent operating position. The need for having a reliable displacement in general entails the need for each pusher, or more generically the pushers that are provided along the conveyor, to be sufficiently rigid to carry out their job satisfactorily.

For example, in a chain conveyor one or more pushers are provided that are constrained to the chain at pre-selected intervals so as to engage on a product that is set on a sliding surface and is to be translated from a first position to a second position.

Should one of these pushers along its path come to interfere with an unexpected object or with a hand or other part of the body of an operator, an impact would ensue. This impact could lead either to breakage, or else to damage of both the pusher element and whatever has interfered with it. The situation of interference could even lead to injury of the machine operator.

This situation is easily solved by providing a pusher of a compliant type which has a trippable operating position when it is subjected to an external force. On the other hand, when the pusher has set itself in the tripped condition, after bumping into the obstacle, there arises the problem of its re-positioning in operation, which must be performed by the operator who is running the conveyor or the machine.

All this entails loss of time and calls for considerable attention on the part of the operator, who must keep under control the positions of all the pushers, setting the ones that for some reason have been sent down back in the operating position.

It may thus be understood what are the problems associated to a conveyor with pushers of this sort.

A purpose of the present invention is to provide a conveyor with pushers that can be tripped in the event of accidental impact of one of them against an unexpected obstacle, such as an external element, or against a part of the body of an operator, which is able, once it has undergone impact, to reset itself in the working position without any external intervention.

Another purpose is to obtain a conveyor with trippable pushers that can be easily and quickly adapted to various sizes of products to be pushed.

Yet another purpose is to provide a conveyor with trippable pushers that can be quickly adapted according to the weight and overall dimensions of the products treated.

These and other purposes according to the invention are achieved by providing a conveyor with automatic-repositioning trippable pushers according to claim 1.

Further characteristics of the conveyor are evident also from the ensuing claims.

The characteristics and advantages of a conveyor with automatic-repositioning trippable pushers according to the present invention will emerge more clearly evident from the ensuing description, which is provided purely to furnish a non-limiting example, with reference to the annexed schematic drawings in which:

FIGS. 6, 7 and 8 are elevations of variants of pusher elements that can be applied to the chain of the conveyor.

Figure 1:
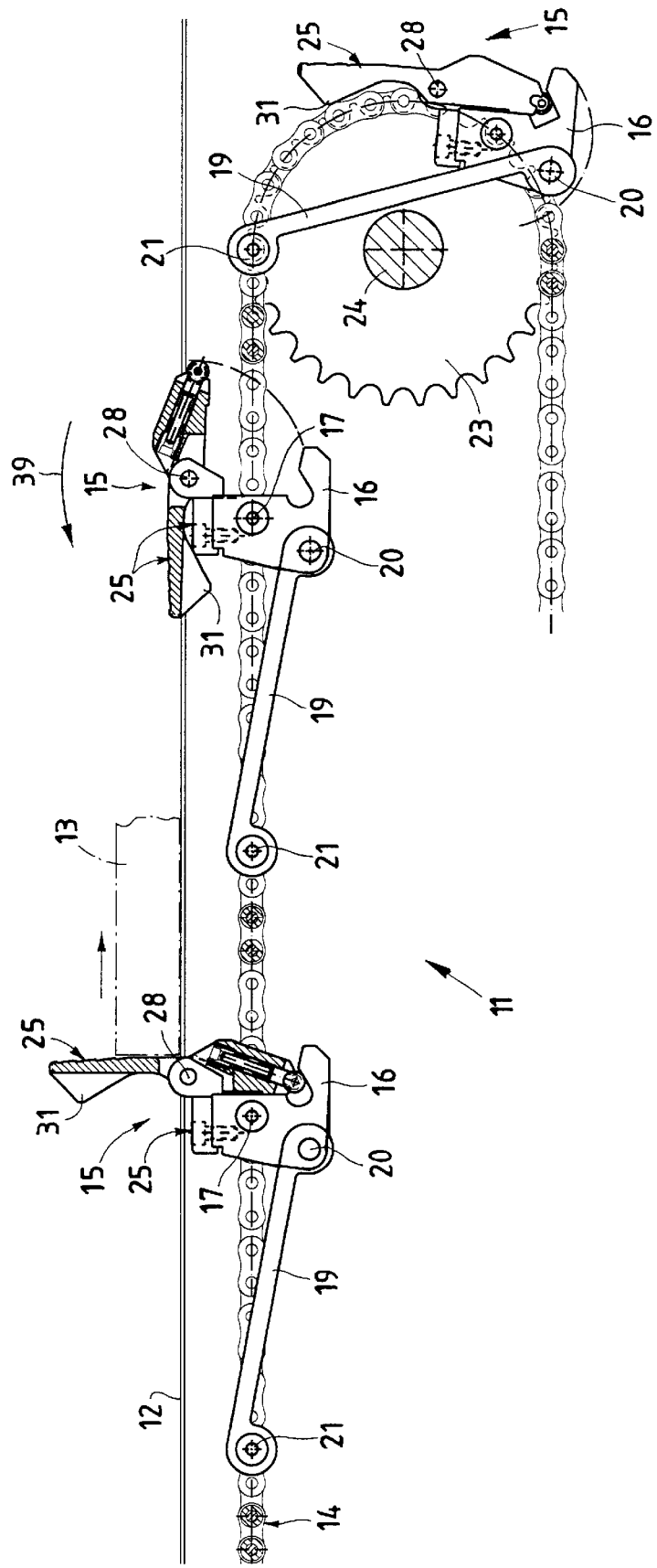
FIG. 1 is a partially sectional side elevation of a portion of a pusher conveyor according to the present invention.
Figure 2:
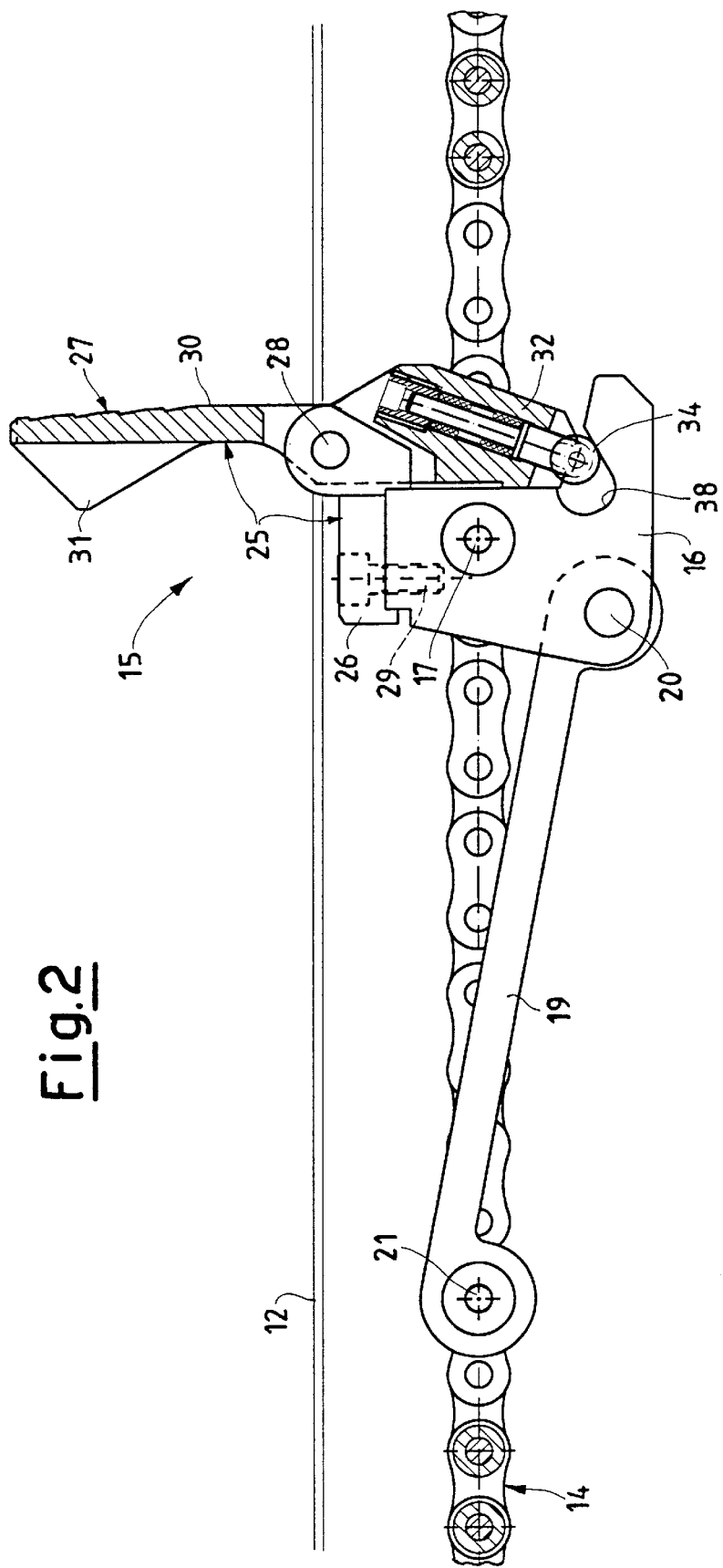
FIG. 2 is a partially sectional enlarged view of a pusher element in the engaged working position.
Figure 3:
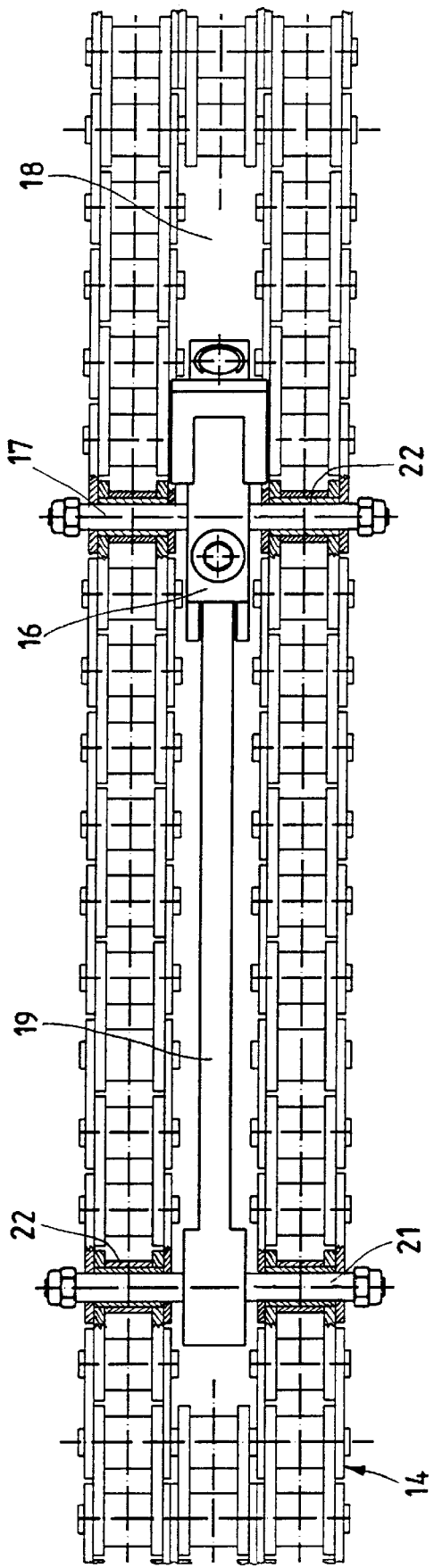
FIG. 3 is a plan view of the detail of FIG. 2.

With reference to the figures, an embodiment of a conveyor with automatic-repositioning trippable pushers is shown and is designated as a whole by 11.

The conveyor 11 is set along a sliding surface 12 for products 13—indicated by dashes and dots—which are to be moved on towards a treatment station or towards a subsequent point of a piece of equipment. A typical example is that of a conveyor for magazines, newspapers or the like, which are to be packaged in a film of plastic material or in a paper wrapper.

The conveyor 11 comprises a drive element 14 of the continuous type wound in a flattened loop, such as an articulated roller chain as in the example described, to which pusher elements, designated as a whole by 15, can be constrained at pre-chosen intervals. In this example, each pusher assembly 15 consists of a carrying element 16 constrained to the chain 14 by means of a pin 17, and a pusher element proper, designated by 25 in FIG. 1 and protruding from the sliding surface 12 at least along the top stretch of chain.

The chain 14 is a three-row chain, and the carrying element 16 is inserted in one cavity, designated by 18 and obtained by removing a portion of the central row of the chain making up the three-row (triple) chain 14.

The carrying element 16 is moreover constrained to one end of a strut or articulated lever 19, by means of a further pin 20, the strut 19 being in turn constrained, at the other end, to the chain by means of yet another pin 21. The latter pin 21 passes through the links of the chain and blocks translation of the end of the chain in the cavity 18, at the same time leaving it free to oscillate. It may be noted that both the pin 20 and the pin 21 are set within bushings 22 built into the two side chains of the triple chain 14. The length and placing of the strut 19 is such as to maintain the carrying element 16 in a vertical position along the top stretch of the path of the chain. In addition, the two pins 20 and 21 are set at such a distance as to enable rotation of the articulated strut 19, which is constrained to the chain also at a point corresponding to two gear wheels 23 set at the opposite ends of the path of the chain, the said gear wheels engaging on the outer rows of the triple chain. The strut 19 is mounted on the chain in such a way as not to interfere with a shaft 24 that bears the gear wheels 23, which are set at a distance apart from one another.

The carrying element 16 functions as a carriage for the pusher element 25 proper and comprises a positioning base 26 and a shaped lever 27 which can oscillate with respect to the base 26 by means of a pin 28 set in between.

The base 26 can be easily and quickly constrained to the carrying element 16 by means of a screw 29 which functions as a freely removable fixing element. The shaped lever 27, which as has been said is pivoted at its centre, is on one side provided with a plane surface 30 functioning as a surface for pushing the products 13, in the rear of the said surface there being made two appendages 31 protruding in the opposite direction, which act as cam elements against the chain 14 during the phase of restoring the pusher assembly 15 in operation. In fact, the appendages 31 provide elements for engagement with the continuous chain 14 in the area of the end pulleys 23 so as to bring the shaped lever 27, which has been oscillated and sent down, automatically back into the operating position, again inserting the elastic elements 34, 37, 38 for engagement between the carrying element 16 and the shaped lever 27.

On the other side, the lever 27 is made as a box-like element 32 within which is inserted a rod 33 which is constrained to a washer 40 bearing a roller 34. The rod 33 is guided and can be translated within a through hole 41 made in a grub screw 36. The grub screw 36 is set within a threaded seat 35 of the box-like element 32. The seat 35 narrows in the central area of the box-element, where a spring 37 is set which acts between the washer 40 and the grub screw 36, and tends to push the roller 34 outwards. The washer 40, which at rest is loaded by the spring 37, sets itself against a contact surface 42 made in the central part of the seat 35.

The carrying element 16, in its bottom part where positioning of the pin 20 is envisaged, is also provided with a recess 38 designed to receive the roller 34. The said recess 38 is made with an inclined bottom surface on which the roller 34 engages by compression of the spring 37, so that the shaped lever 27 of the pusher element is stably withheld in position. In this way, elastic-engagement elements 34, 37, 38 are obtained, between the carrying element 16 and the shaped lever 27, which keep the shaped lever 27 in a pushing position where it exerts thrust against a pre-determined or selected force, yielding when a higher opposing force, generated by an obstacle or something else, is exceeded.

The above engagement, which may be adjusted by means of the grub screw 36 and according to the load that may be applied by means of the spring 37, is overcome in the case of impact of an unexpected obstacle against the surface 30 of the lever 27. In fact, by overcoming the elastic force of the spring 37, the obstacle determines sliding of the roller 34 on the bottom inclined surface of the recess 38, so that the roller 34 comes out of the recess 38, and the lever 27 is tripped in the direction indicated by the arrow 39 about the pin 28.

Figure 4:
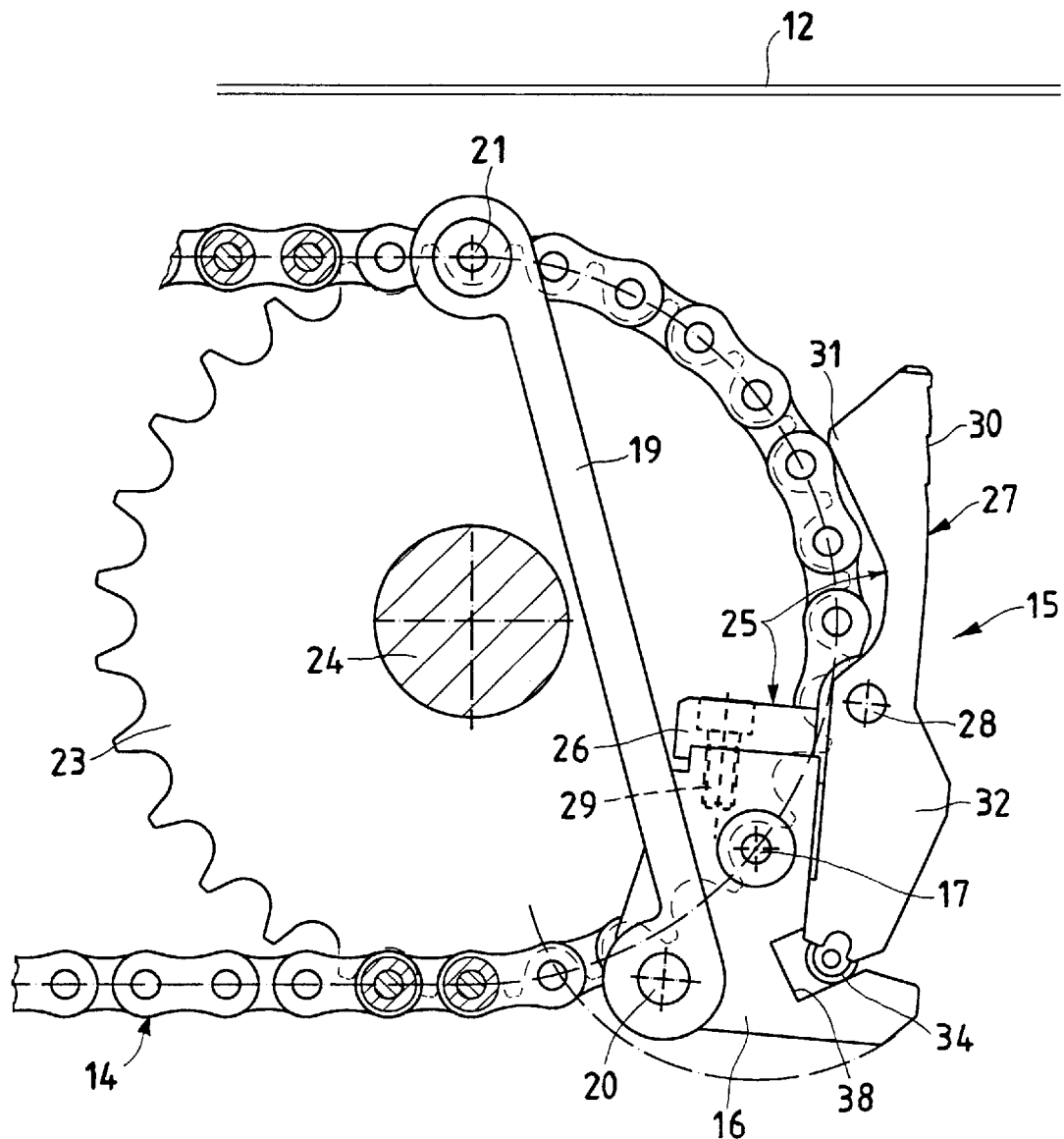
FIG. 4 is an enlarged view of a pusher element in the return position engaged for working.
Figure 5:
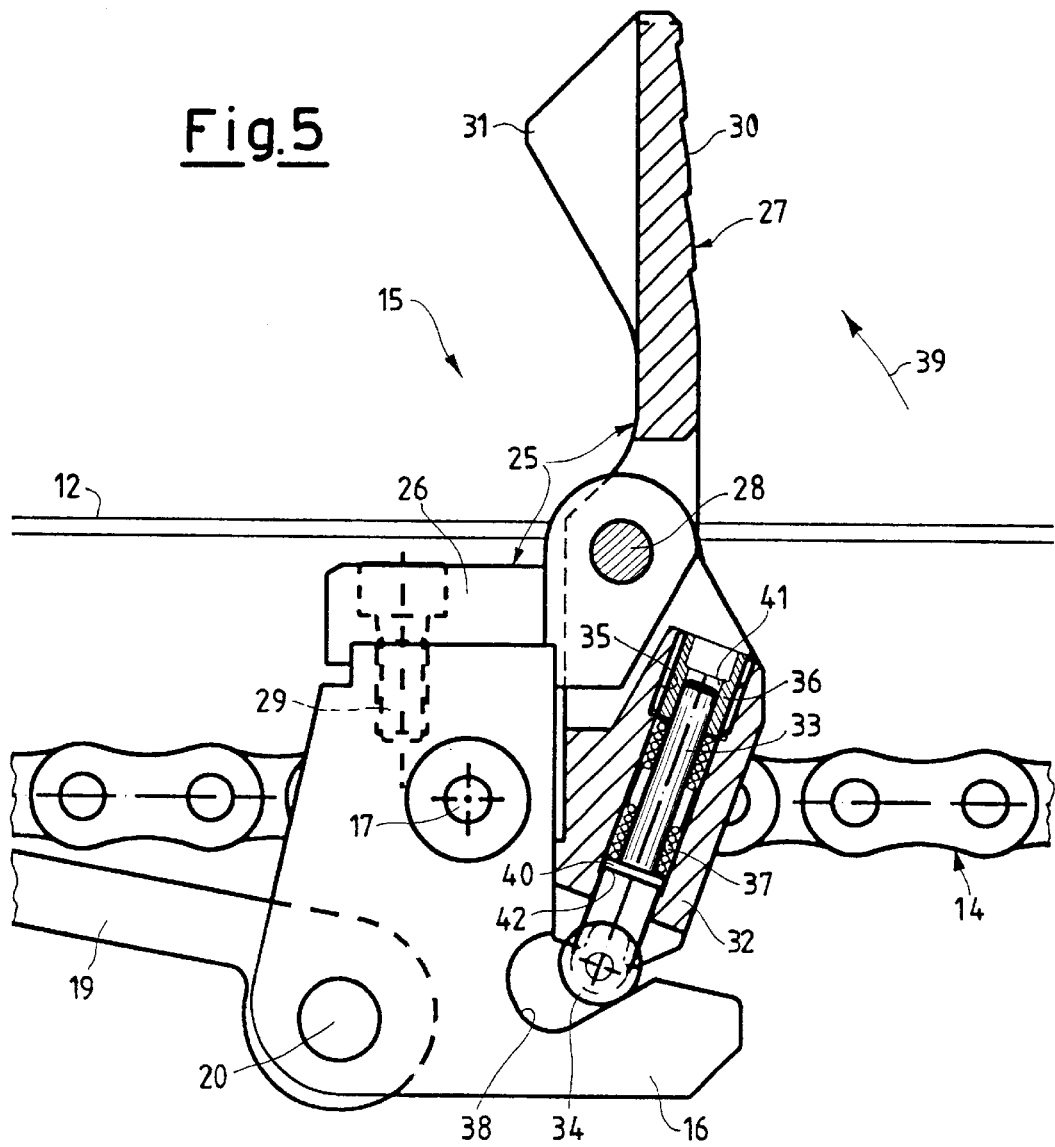
FIG. 5 is a more enlarged view of a pusher element in the working position.

Further advance of the chain 14 brings the lever 27 into the portion of the conveyor where the gear wheels 23 are provided, i.e., at the reverse bend of the chain. The presence of the articulated strut 19 keeps the carrying element 16 in a practically vertical position, and in this way the two appendages 31 interact with the links of the chain, determining rotation of the entire strut 19. FIGS. 1 and 4 illustrate how, whilst the chain continues to rotate over the gear wheels 23, the appendages 31 continue their engagement on the links of the chain and gradually insert the roller 34 in the recess 38 up to the stable and final position.

The presence of the strut 19, which is constrained in an articulated way both to the chain 14 and to the carrying element 16, guarantees the fact that the lever 27 of the pusher assembly 15 sets itself again in the top branch of the chain in a position perpendicular to the sliding surface 12 when it comes out of the latter.

Should, on account some unforeseeable problem, the lever 27 fail to be raised up again into the operating position because it exits slightly from the sliding plane, when it passes through the area of feed of the products 13, it passes underneath the said products and raises them up. A sensor (not shown) may then be provided which detects the said raising of the product and activates an alarm, so that it is possible to intervene to restore correct operation of the entire conveyor.

It should moreover be noted how, advantageously, the pusher element proper may be made with different heights, both in the form designated by 25 in FIG. 6 and in a form of greater height, designated by 125 in FIG. 7. The important fact is that the appendages 31 should always be made in such a way as to effect tripping in the operating position of the shaped lever 27 whatever the size of the latter.

FIG. 8 shows how, advantageously, on the carrying element 16 of a conveyor with trippable pushers according to the present invention it is possible to mount also a fixed pusher 225 by means of the screw 29 thanks to the presence of a bottom part 226 shaped as a positioning base.

Also in this case, the fixed pushers 225 can be made with various heights according to the requirements and are particularly suited for moving on products having considerable weight and overall dimensions.

It is evident that the pusher assemblies 15 bearing both the trippable pusher elements 25, 125 and the fixed pusher elements 225 can be set on the chain or continuous-drive element at pre-chosen intervals which can be varied as desired.

What is claimed is:

1. A conveyor with automatic-repositioning trippable pushers, set along a sliding surface (12) for products (13) that are to be moved onwards and comprising a continuous-drive element wound in a flattened loop (14) to which there may be constrained, at pre-chosen intervals, pusher assemblies (15), characterized in that each pusher assembly (15) consists of a carrying element (16) constrained to said continuous-drive element (14) by means of a pin (17) and of a pusher element proper (25, 125) that is trippable and comprises a base (26) and a shaped lever (27) that can oscillate (in 28) with respect to said base (26), there being provided elements of elastic engagement (34, 37, 38) between said carrying element (16) and said shaped lever (27) which keep said shaped lever (27) in a position of thrust against a pre-determined force, yielding when a greater opposing force is exceeded, there further being provided, on said lever (27), elements of engagement (31) with said continuous-drive element (14) at points corresponding to end pulleys (23) which automatically bring said shaped lever (27) that is oscillated and sent down back into an operating position, inserting again said elastic-engagement elements (34, 37, 38) between said carrying element (16) and said shaped lever (27).

2. A pusher conveyor according to claim 1, characterized in that said continuous-drive element consists of a chain (14).

3. A pusher conveyor according to claim 1, characterized in that said continuous-drive element consists of a multi-row chain (14).

4. A pusher conveyor according to claim 1, characterized in that said carrying element (16) is constrained in an articulated way to said continuous-drive element (14) by means of a strut (19) set in between which keeps it perpendicular to said sliding surface (12) and co-operates to restoring said elastic-engagement elements (34, 37, 38) into the operating condition.

5. A pusher conveyor according to claim 1, characterized in that said carrying element (16) may also carry, by means of a fixing element (29), a fixed pusher element (225).

6. A pusher conveyor according to claim 1, characterized in that each of said pusher assemblies (15) is set on said continuous-drive element (14) at pre-chosen intervals that may be varied as required.

7. A pusher conveyor according to claim 1 or claim 4, characterized in that said engagement elements are appendages (31) which are set at the rear of said shaped lever (27) and are designed to engage on said continuous-drive element (14).

8. A pusher conveyor according to claim 1, characterized in that said elastic-engagement elements comprise on one side at least one spring (37) inserted in a box-like portion (32) of said lever (27) and bearing a roller (34) that can engage inside a recess (38) made in said carrying element (16).

9. A pusher conveyor according to claim 8, characterized in that said recess (38) is provided with a bottom inclined surface on which said roller (34) engages.

10. A pusher conveyor according to claim 8, characterized in that to said spring (37) an adjustment element (36) can be associated.

11. A pusher conveyor according to claim 1, characterized in that said trippable pusher element (25, 125) of each pusher assembly (15) is freely removable (in 29) from said carrying element (16).

12. A pusher conveyor according to claim 11, characterized in that said trippable pusher element (25, 125) is freely removable from said carrying element (16) by means of a fixing screw (29) that screws inside said carrying element (16).

* * * * *